United States Patent [19]
Daoud

[11] Patent Number: 6,116,447
[45] Date of Patent: Sep. 12, 2000

[54] EXPANDABLE ENCLOSURE

[75] Inventor: Bassel Hage Daoud, Parsippany, N.J.

[73] Assignee: Lucent Technologies Inc., Murray Hill, N.J.

[21] Appl. No.: 09/356,630

[22] Filed: Jul. 19, 1999

[51] Int. Cl.$^7$ ..................................................... B65D 6/00
[52] U.S. Cl. ............................................. 220/4.03; 220/8
[58] Field of Search ................... 220/4.03, 4.02, 220/4.21, 4.31, 8

[56] References Cited

U.S. PATENT DOCUMENTS

| | | | |
|---|---|---|---|
| 1,120,955 | 12/1914 | Martin | 220/8 X |
| 1,212,948 | 1/1917 | Hesse | 220/8 |
| 1,941,375 | 12/1933 | Wildman | 220/8 X |
| 5,875,912 | 3/1999 | Hobson | 220/4.03 |

*Primary Examiner*—Steven Pollard
*Attorney, Agent, or Firm*—Stroock & Stroock & Lavan LLP

[57] ABSTRACT

An expandable enclosure with a base having a stationary section and a sliding section. The stationary section has a pair of side edges, each of which has elongated guide tracks formed thereon. The sliding section similarly has a pair of side edges each of which has a second set of elongated guide tracks which slide matingly with the first elongated guide track such that the base can be enlarged by sliding the sliding section relative to the stationary section from a closed position into an expanded position. A preferred embodiment of the invention has a door or cover having a stationary section and a sliding section.

7 Claims, 6 Drawing Sheets

EXPANDABLE ENCLOSURE

FIELD OF THE INVENTION

This invention relates generally to an expandable enclosure for use with electrical components or telephone lines and in particular to flexibly providing an enclosure that may be made larger or smaller as required.

BACKGROUND OF INVENTION

Telephone lines, which are carried by electrical conductors known as tip ring wire pairs, are generally aggregated at a particular point in a building prior to being distributed and connected to various types of telephone equipment, such as, for example, telephones, fax machines, modems etc. As the tip ring pairs generally enter the building as part of a multi-conductor cable, the individual tip ring wire pairs must first be broken out from the cable into individual wire pairs. This is normally accomplished in a junction box known as, for example, a building entrance protector (BEP), or network interface unit (NMU). Within such devices the individual telephone line tip ring pairs are separated from the cable, individually connected to a connector block, and made available for further electrical connection and distribution. Usually there is a protector device inserted between the telephone and central office, or network side of the telephone line and the customer equipment or terminal side of the telephone line to protect the telephone and user, or other equipment connected to the telephone line, from hazardous overvoltages induced in the telephone network or in the cables passing between the telephone central office and the building within which the line is terminated.

As is often necessary in office buildings or apartment complexes, and other large structures which require multiple items of terminal equipment to be connected to an individual telephone line, there is yet another connector array or field required to effect the distribution of a single telephone line to multiple points within the structure. Enclosures to house the aforementioned arrays and fields are designed in many different sizes. Often times, it is necessary to add additional components to an enclosure which is already filled to capacity. In this instance, a bigger enclosure would be needed to replace the existing one. The existing wiring or devices would also have to be disconnected and then reconnected in a new larger enclosure.

SUMMARY OF THE INVENTION

The present invention provides an expandable enclosure. The expandable enclosure can be expanded to allow for the mounting of additional components without replacement and re-wiring.

The expandable enclosure of the present invention may be used or designed as an enclosure of any type known in the art. While in an exemplary embodiment an outdoor enclosure is shown and described, it will be recognized by the person of skill that the enclosure may be of any type that may at some point require additional interior surface area for the mounting of components therein. The enclosure has a base section, within which may be mounted any device, structure or component known in the art and generally retained in enclosures, such as, by way of non-limiting example, telephone wiring or circuitry, electrical components, cable TV equipment, signaling devices, traffic signal controllers, and the like, any or all of which require shielding from the elements or unauthorized persons.

The expandable enclosure is designed with a base section having two sections or portions. The first section, the stationary section of the base, has side walls which have channels or elongated guide tracks formed thereon. The second section, the sliding section, is guided into the channels or guide tracks of the stationary section. The sliding section of the base is constructed such that it is slightly smaller that the stationary section and therefore can nest inside the stationary section. The two sections are matingly joined by the channels or elongated guide tracks for sliding movement relative to each other. The sliding section can be moved downward or upward with respect to the stationary section, uncovering additional interior surface area of the stationary base section. Additionally, because the two sections are joined by the mating of the elongated guide tracks, water is prevented from entering the enclosure because the interlocked mating portions can act as a rain shield when used outdoors.

In another preferred embodiment of the invention, the expandable enclosure is designed with a cover, or door. The door similarly has a stationary door section with channels or guide tracks in the side edges. The sliding door section similarly has channels or guide tracks and is matingly guided in the channels or guide tracks of the stationary door section. The sliding door section is similarly constructed as being slightly smaller than the stationary door section to therefore nest within the stationary door section. The two door sections are matingly joined by the elongated guide tracks. When a door is present on the enclosure, hinges can be used not only to facilitate opening and closing of the door, but also to join the sliding base section and the sliding door section to each other such that the door and the base sections will be expanded and retracted concomitantly, thus assuring that they are the same size. This telescoping enlarging action of the base and door sections allows for the addition of more components to the enclosure when necessary.

When additional components need to be added, the sliding section of the expandable enclosure slides within the channels or guide tracks of the stationary section allowing the enclosure to be enlarged. The stationary section includes an interior surface upon which additional components could be added. Therefore, the existing enclosure would not need to be replaced, rather, additional interior surface area would be provided for new components. The enclosure design also prevents water and the elements from entering the enclosure because each of the sliding sections on the base and door mate respectively with the stationary sections of the base and door, providing a water resistant seal along the respective elongated guide tracks.

BRIEF DESCRIPTION OF THE DRAWINGS

In the drawing figures, which are not to scale, and which are merely illustrative, and wherein like referenced numerals depict like elements throughout the several views.

DETAILED DESCRIPTION OF THE PREFERRED EMBODIMENTS

Figure 1:
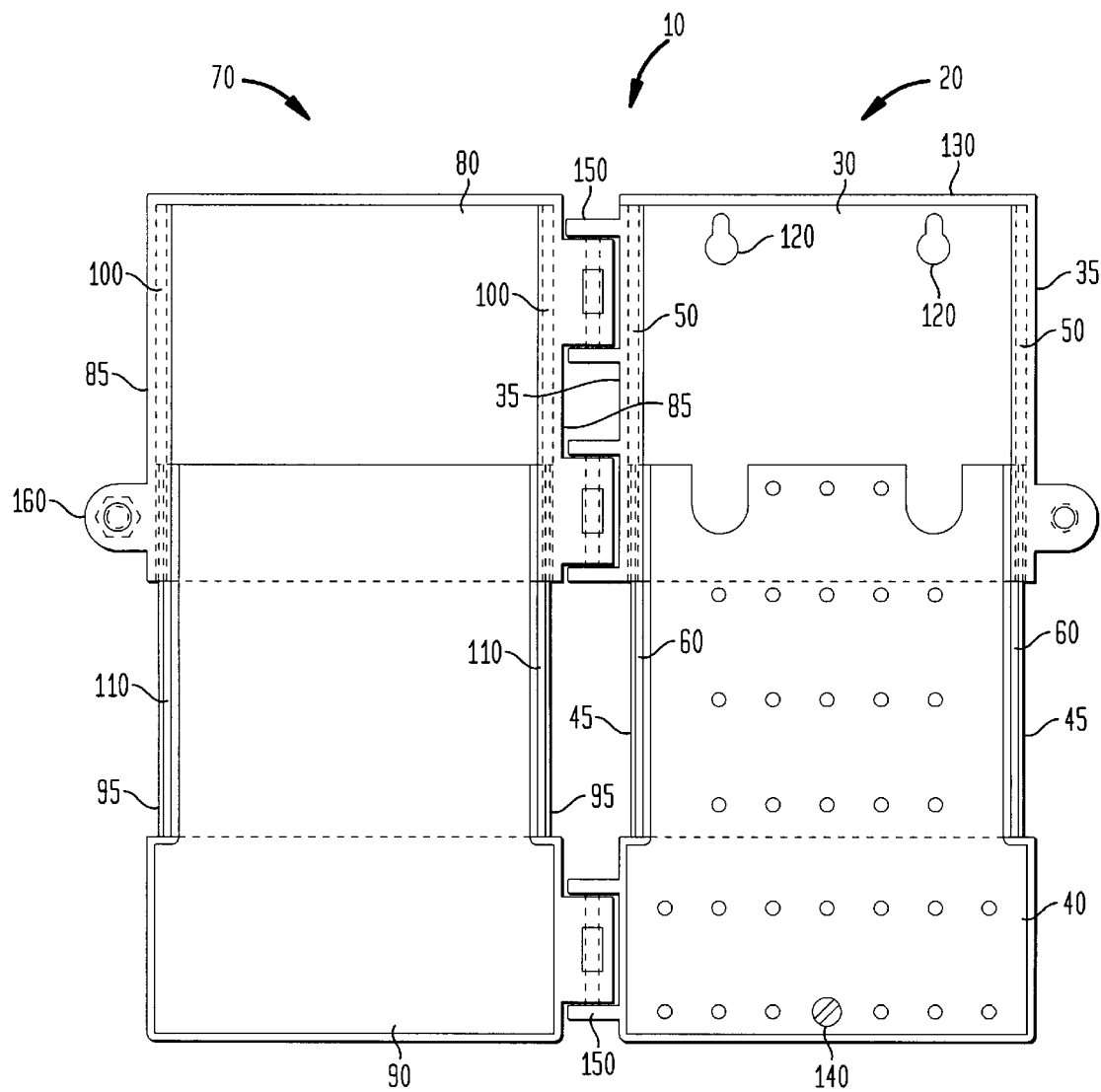
FIG. 1 is a front view of an expandable enclosure in the expanded position in accordance with a preferred embodiment of the invention.
Figure 2:
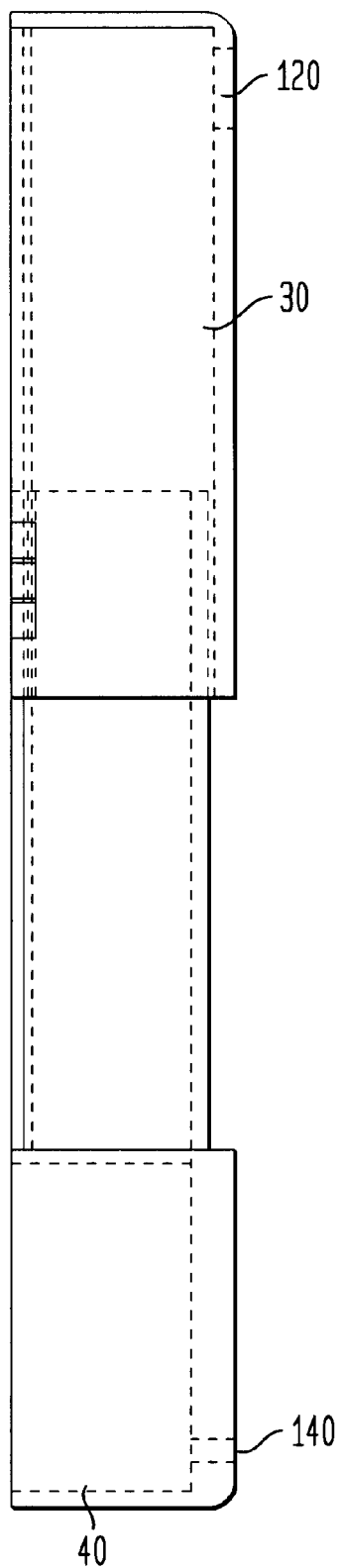
FIG. 2 is a side view of the expandable enclosure of FIG. 1.
Figure 3:
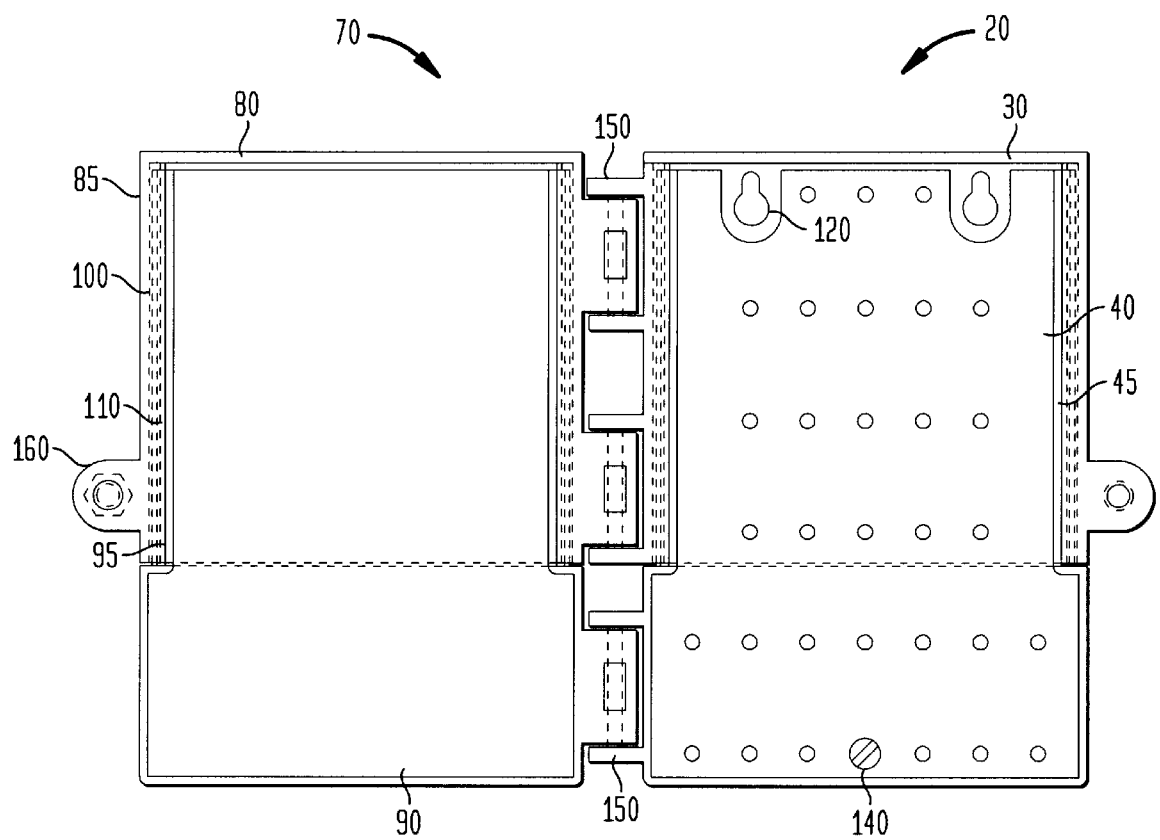
FIG. 3 is a front view of the expandable enclosure in the unexpanded position in accordance with a preferred embodiment of the invention.

With initial reference to FIGS. 1–3 there is depicted an expandable enclosure in accordance with a preferred embodiment of the present invention. The expandable enclosure has an interior portion or a base 20, within which or upon which may be mounted any device, structure or component known in the art and generally retained in enclosures, such as, by way of non-limiting example, telephone wiring or circuitry, electrical components, cable TV equipment, signaling devices, traffic signal controllers, and the like, many of which require shielding from the elements or unauthorized persons. The enclosure of the present invention, however, may be flexibly utilized indoors or out.

The expandable enclosure, generally depicted as 10, includes a base 20 having a first or stationary section 30 and a sliding section 40. Both the stationary section 30 and the sliding section 40 may have components mounted upon them. Particular reference is made to FIG. 3, where the expandable enclosure 10 is depicted in the closed or unexpanded position. When the enclosure is in the closed position, the entirety or at least a portion of stationary section 30 will not be visible or useable to mount components upon. Stationary section 30 is not visible or useable when the enclosure is not in the expanded position because it will be obstructed from view and use by sliding section 40. In order to mount components upon stationary section 30, sliding section 40 and stationary section 30 must be moved relative to each other in order to uncover the mounting surface of stationary section 30.

Figure 4:
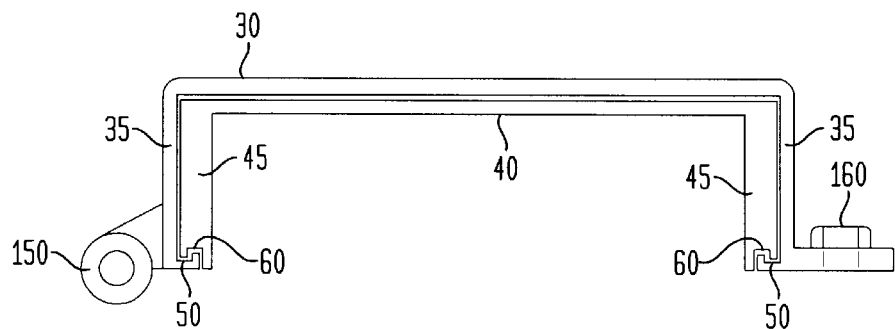
FIG. 4 is a cross sectional view of the base of the expandable enclosure as depicted in FIG. 3.

With reference to FIGS. 3 and 4, the stationary section 30 has a pair of side edges 35. Each edge 35 has a first elongated guide track 50. The sliding section 40 similarly has a pair of side edges 45. Formed on each side edge 45 is a second elongated guide track 60 which is slidingly mated with the first elongated guide track 50 such that the base 20 can be enlarged by sliding said sliding section 40 relative to said stationary section 30 from a closed position as depicted in FIG. 3 to an expanded position as depicted in FIG. 1. Once the enclosure 10 has been expanded and stationary section 30 is now accessible, components can be mounted upon stationary section 30, as well as the sliding section 40. The telescoping feature allowing enclosure 10 to be expanded provides the advantage of exposing additional surface area in the enclosure upon which to mount components, without the necessity of removing a smaller enclosure for replacement with a larger one, thus avoiding the associated labor and expense of such replacement.

Figure 5:
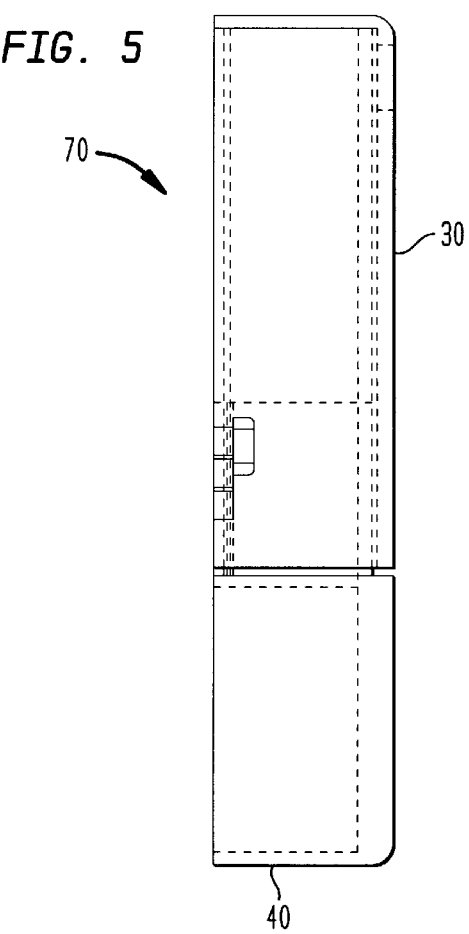
FIG. 5 is a side view of the expandable enclosure as depicted in FIG. 3.
Figure 6:
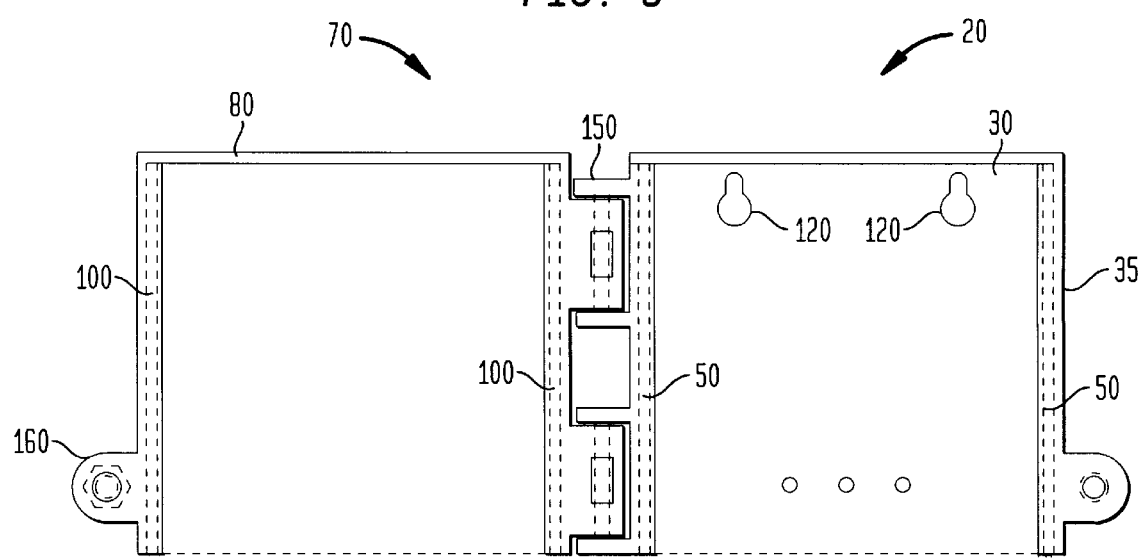
FIG. 6 is a front view of the stationary section of the expandable enclosure constructed in accordance with a preferred embodiment of the present invention.
Figure 7:
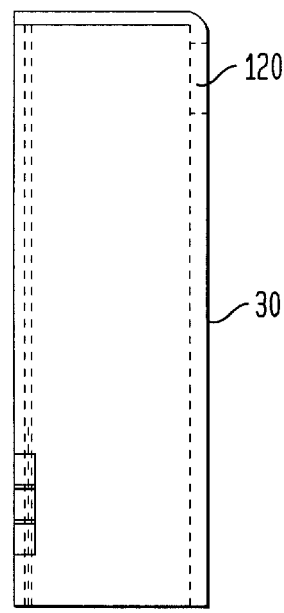
FIG. 7 is a side view of the stationary section of the expandable enclosure as depicted in FIG. 6.
Figure 8:
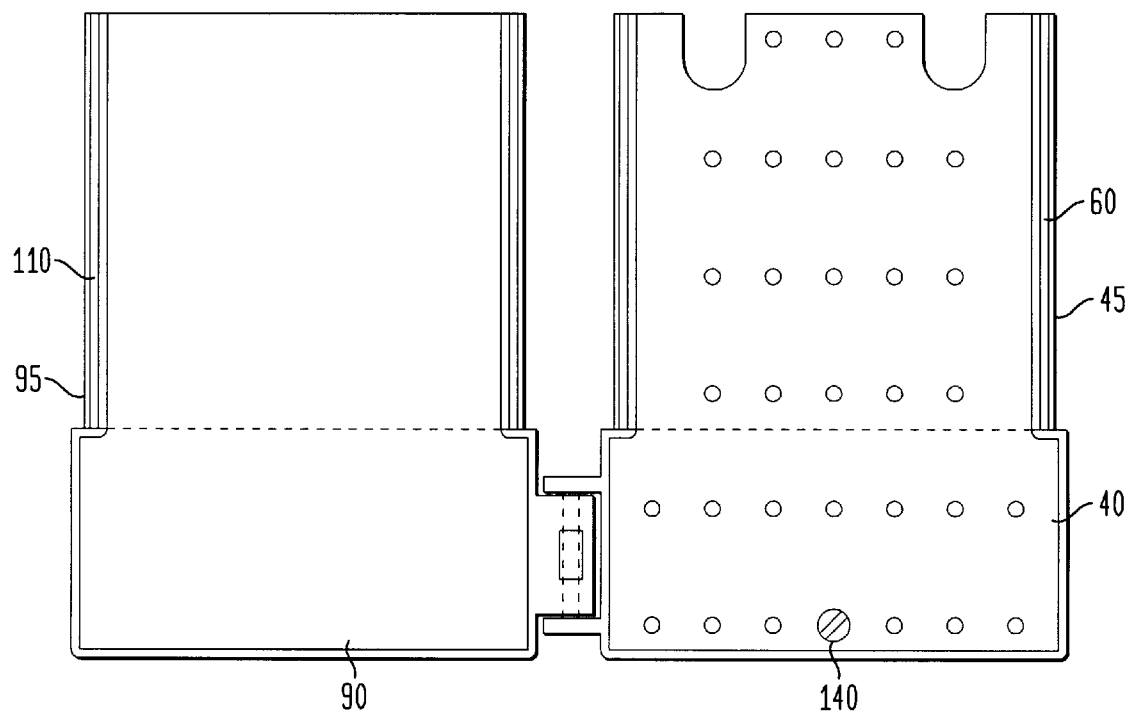
FIG. 8 is a front view of the sliding section of the expandable enclosure constructed in accordance with a preferred embodiment of the preferred invention.
Figure 9:
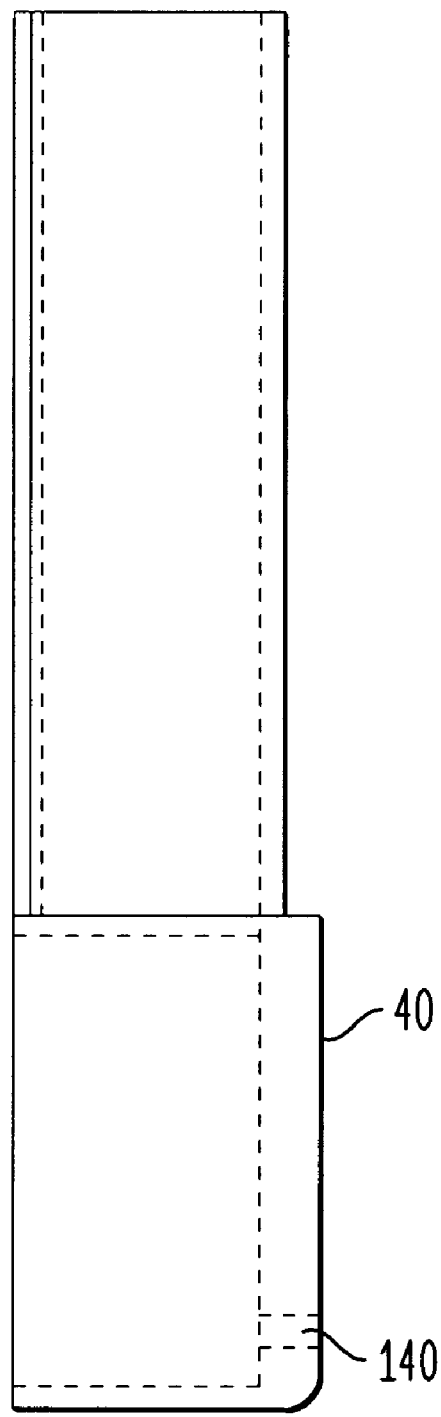
FIG. 9 is a side view of the sliding section of the expandable enclosure as depicted in FIG. 8.

As is depicted in FIGS. 4–9, the stationary section 30 is in part constructed slightly larger than sliding section 40 such that the sections mate with each other at the first and second elongated guide tracks 50, 60 in a nested position (FIG. 4) when the enclosure is in the closed or unexpanded position. The base 20 is expanded by the telescoping action of moving the sliding section 40 either upward or downward, depending upon how the enclosure is mounted, away from the stationary section 30. The two base sections 30, 40 remain joined by the elongated tracks 50, 60 which slidingly matingly engage with each other. The result is an enclosure 10 which is expanded, but intact, i.e. without any gaps in the base or side walls (FIG. 5). Once the sliding section 40 of the base 20 has been moved away from the stationary section 30, the portion of the stationary section 30 which was not visible or useable in the unexpanded position now becomes both visible and useable.

In a preferred embodiment of the present invention the expandable enclosure 10, as described above, has a cover or door 70 (FIGS. 1, 3, 6 and 8) having a stationary door section 80 and a sliding door section 90. The stationary door section 80 of door 70 has a pair of side edges 85. Each side edge 85 has formed thereon a third elongated guide track 100. The sliding door section 90 similarly has a pair of side edges 95. Each side edge 95 has formed thereon a fourth elongated guide track 110 which slides matingly with the third elongated guide track 100 such that door 70 can be enlarged by sliding the sliding door section 90 relative to the stationary door section 80 from a closed position into an expanded position.

As depicted in FIGS. 1 and 3, the stationary door section 80 and sliding door section 90 of door 70 are constructed similarly to the base sections described above. The stationary door section 80 is in part slightly larger Man sliding door section 90 and the two sections mate via the third and fourth elongated guide tracks 100, 110. When the door is in the unexpanded position, the sliding door section 90 nests in part within stationary door section 80. The door 70 is expanded by telescoping sliding door section 90 away from stationary door section into an expanded position. The door 70 and the base 20 are preferably expanded and closed relative to each other, such that the door will always be the same height as the base. This feature, along with the fact that the respective sliding and stationary sections nest with each other, helps to prevent wind, water and other elements from entering the enclosure and damaging components contained within.

As described above with reference to the base sections, the stationary door section 80 is similarly not visible when door 70 is in the closed or unexpanded position. As is depicted in FIGS. 1 and 3, the stationary door section 80 is constructed only slightly larger than sliding door section 90 such that the sections mate with each other at the third and fourth elongated guide tracks 100, 110 in a nested position when the enclosure 10 is in the closed or unexpanded position. The door 70 is expanded by the telescoping action of moving the sliding door section 90 either upward or downward, depending upon how the enclosure is mounted, away from the stationary door section 80. The two door sections 80, 90 remain joined by the elongated tracks 100, 110 which matingly engage with each other. The result is an enclosure 10 which is expanded, but intact, i.e. without any gaps in the door or side walls. Once the sliding door section 80 of the door 70 has been moved away from the stationary door section 90, the portion of the stationary door section 80 which was not visible in the unexpanded position, now becomes both visible and useable.

In a preferred embodiment of the invention, the base 20 of the expandable enclosure 10 is fitted with mounting brackets 120 that are located on the exterior rear wall 130 of the base allowing said expandable enclosure 10 to be mounted to a surface. The mounting brackets 120 will be located on stationary base section 30 and permit mounting therethrough of a screw, bolt, nail or other art-recognized securement member for keeping said stationary base section 30 in a stationary position on a mounting surface. A screw or other securement member 140, such as for example, a nail, bolt, pin, snap or the like may be located on or passed through a bracket similar to bracket 120 or other aperture formed in a lower bottom portion of the sliding section 40. The securement member 140 prevents the enclosure 10 from expanding further than desired. The securement member 140 achieves this result by preventing sliding section 40 from moving downward or upward with reference to stationary section 30. Because the enclosure is intended to be expanded as necessary, the securement member 140 can be removed from the surface upon which enclosure 10 is mounted and then reinserted at another position, after expansion.

Further, one or more hinges 150 may connect the base 20 to the door 70 allowing the door 70 to be opened and closed as well as providing a connection which assists in achieving alignment between the base 20 and the door 70, and particularly the base sliding section 40 and the door sliding section 90. Hinges 150 can be used to not only facilitate opening and closing of the door, but also to join the base sliding section 40 and the door sliding section 90 such that the door 70 and the base 20 will be expanded and retracted at the same time, assuring that they are the same size. This telescoping action of the base 20 and door 70 sections allows for the addition of more components to the enclosure when necessary. Finally, a door latch 160 may be added to secure the door 70 to the base 20.

The enclosure of the present invention may be formed of any sufficiently rigid, formable material suited to the applications described herein, such as, for example, plastic or metal. The enclosure portions may be made by bending malleable sheets of metallic or plastic material, or by machining a suitable machineable material, or by injection molding of plastic parts. Further the enclosure may be any suitable size or shape, and may be supplied with or without a door or other covering. The base portion may also be essentially flat to function as an expandable backboard or cross connect field. Moreover, the particular arrangement for sliding the relative sections with respect to each other need not be limited to the guide channels shown, but may be any known construction to achieve guided relative movement.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A mountable expandable enclosure comprising:
    a base having a stationary section and a sliding section;
    said stationary section having a planar stationary wall portion and a pair of side edges extending therefrom, each edge of said pair having formed thereon a first elongated guide track;
    said sliding section having a pair of side edges, each edge of said pair having formed thereon a second elongated guide track in slidingly guided mating engagement with said first elongated guide track such that the base can be enlarged by moving said sliding section relative to said stationary section from a closed position into an expanded position;
    said stationary section having a stationary wall securement member mountable on said wall portion to facilitate mounting said enclosure to a vertical mounting surface; and
    said sliding section having a planar sliding wall portion, said sliding wall portion overlying and moveable relative to said stationary wall portion and being so sized and shaped as to permit access to said stationary wall securement member when said sliding wall portion overlies said stationary wall portion to its fullest extent, said sliding wall portion having a sliding wall securement member to facilitate securement of said sliding wall portion to said mounting surface in a desired position relative to said stationary wall surface.

2. The expandable enclosure of claim 1 further comprising:
    a door having a stationary door section and a sliding door section;
    said stationary door section having a pair of side edges, each edge of said pair having formed thereon a third elongated guide track;
    said sliding door section having a pair of side edges, each edge of said pair having formed thereon a fourth elongated guide track in slidingly guided mating engagement with said first elongated guide track such that the door can be enlarged by moving said sliding door section relative to said stationary door section from a closed position into an expanded position.

3. The expandable enclosure of claim 2 wherein the first, second, third and fourth elongated guide tracks are mating channels.

4. The expandable enclosure of claim 3 wherein the first, second, third and fourth elongated guide tracks are L-shaped.

5. The expandable enclosure of claim 1 wherein the first and second elongated guide tracks are mating channels.

6. The expandable enclosure of claim 5 wherein the first and second elongated guide tracks are L-shaped.

7. A method of making an expandable mountable enclosure, the method comprising the steps of:
    forming a base having a stationary section and a sliding section;
    forming on said stationary section a planar stationary wall portion and a pair of side edges extending therefrom, each edge of said pair having formed thereon a first elongated guide track;
    forming on said sliding section a pair of side edges, each edge of said pair having formed thereon a second elongated guide track in slidingly guided mating engagement with said first elongated guide track such that the base can be enlarged by moving said sliding section relative to said stationary section from a closed position into an expanded position;
    forming on said stationary section a stationary wall securement member to facilitate mounting said enclosure to a vertical mounting surface;
    forming on said sliding section a planar sliding wall portion, said sliding wall portion overlying and moveable relative to said stationary wall portion and being so sized and shaped as to permit access to said stationary wall securement member when said sliding wall portion overlies said stationary wall portion to its fullest extent; and
    forming on said sliding wall portion a sliding wall securement member to facilitate securement of said sliding wall portion to said mounting surface in a desired position relative to said stationary wall surface.

* * * * *